(12) United States Patent
Matsuo et al.

(10) Patent No.: US 10,326,542 B2
(45) Date of Patent: Jun. 18, 2019

(54) WIRELESS COMMUNICATION DEVICE AND WIRELESS COMMUNICATION METHOD

(71) Applicant: KABUSHIKI KAISHA TOSHIBA, Minato-ku, Tokyo (JP)

(72) Inventors: Ryoko Matsuo, Tokyo (JP); Tomoya Tandai, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 95 days.

(21) Appl. No.: 15/420,631

(22) Filed: Jan. 31, 2017

(65) Prior Publication Data

US 2017/0272183 A1  Sep. 21, 2017

(30) Foreign Application Priority Data

Mar. 16, 2016  (JP) .................................. 2016-052910

(51) Int. Cl.
| | |
|---|---|
| *H04B 7/06* | (2006.01) |
| *H04B 7/08* | (2006.01) |
| *H04L 5/00* | (2006.01) |
| *H04W 16/28* | (2009.01) |
| *H04B 17/318* | (2015.01) |
| *H04B 7/0408* | (2017.01) |

(52) U.S. Cl.
CPC ......... *H04B 17/318* (2015.01); *H04B 7/0695* (2013.01); *H04B 7/088* (2013.01); *H04L 5/0048* (2013.01); *H04B 7/0408* (2013.01); *H04L 5/005* (2013.01); *H04W 16/28* (2013.01)

(58) Field of Classification Search
CPC ... H04B 17/318; H04B 7/0408; H04L 5/0048; H04L 5/005; H04W 16/28
See application file for complete search history.

(56) References Cited

U.S. PATENT DOCUMENTS

| | | | |
|---|---|---|---|
| 6,336,033 B1 | 1/2002 | Yamaguchi et al. | |
| 6,898,441 B1 | 5/2005 | Kogiantis et al. | |
| 7,117,017 B2* | 10/2006 | Chen | H01Q 1/246 455/562.1 |
| 7,302,238 B2 | 11/2007 | Fujil | |
| 7,406,055 B2 | 7/2008 | Taira et al. | |
| 8,521,093 B2 | 8/2013 | Shiotsuki et al. | |
| 8,594,734 B2 | 11/2013 | Kish et al. | |

(Continued)

FOREIGN PATENT DOCUMENTS

| | | |
|---|---|---|
| JP | H07-170227 A | 7/1995 |
| JP | 2002-135204 A | 5/2002 |

(Continued)

OTHER PUBLICATIONS

Stacey, Robert: "Specification Framework for TGax", IEEE 11-15-0132-15-00ax-spec-framework, Intel, Jan. 2016, pp. 1-43.

(Continued)

*Primary Examiner* — Brian T O Connor
(74) *Attorney, Agent, or Firm* — Foley & Lardner LLP

(57) ABSTRACT

According to one embodiment, a wireless communication device includes controlling circuitry configured to adjust a directivity of each of a plurality antennas based on a received power of a first frame for each of the plurality of antennas; and a transmitter configured to transmit a second frame for responding to the first frame after the directivity is adjusted.

15 Claims, 16 Drawing Sheets

(56) References Cited

U.S. PATENT DOCUMENTS

| | | | | |
|---|---|---|---|---|
| 8,886,254 B2* | 11/2014 | Oyama | | H04W 16/28 370/252 |
| 9,363,007 B2* | 6/2016 | Yokosawa | | H04B 7/15571 |
| 2011/0117855 A1 | 5/2011 | Salo et al. | | |

FOREIGN PATENT DOCUMENTS

| | | |
|---|---|---|
| JP | 2005-012357 A | 1/2005 |
| JP | 2010-283476 A | 12/2010 |
| WO | WO-98/56068 A1 | 12/1998 |
| WO | WO-2004/095730 A1 | 7/2006 |

OTHER PUBLICATIONS

Stacey, Robert: "Specification Framework for TGax", IEEE 11-15-0132-17-00ax-spec-framework, Intel, May 2016, pp. 1-61.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Inoue et al.: "Beyond 802.11ac—a Very High Capacity WLAN", IEEE 802.11-13/0287r3, NTT, Mar. 2013, pp. 1-12.

Ruckus, BeamFlex® Technology, (https://www.ruckuswireless.com/rucktionary), 2017.

Ruckus, Beam Flex® Smart Antenna System Feature Sheet (fs-beamflex.pdf), (https://www.ruckuswireless.com), 2015.

Stacey, Robert: "Specification Framework for TGax", IEEE 802.11-15/0132r15, Intel, Jan. 2016, pp. 1-43.

* cited by examiner

| TERMINAL | ANTENNA 12A | ANTENNA 12B | ANTENNA 12C | ANTENNA 12D |
|---|---|---|---|---|
| TERMINAL 1 | DIRECTIVITY A | DIRECTIVITY B | DIRECTIVITY C | DIRECTIVITY D |
| TERMINAL 2 | ... | ... | ... | ... |
| TERMINAL 3 | ... | ... | ... | ... |
| ... | ... | ... | ... | ... |

(A)

| TERMINAL | ANTENNA 12A | ANTENNA 12B | ANTENNA 12C | ANTENNA 12D |
|---|---|---|---|---|
| TERMINAL 1 | DIRECTIVITY A | DIRECTIVITY A | DIRECTIVITY A | DIRECTIVITY A |
| TERMINAL 2 | ... | ... | ... | ... |
| TERMINAL 3 | ... | ... | ... | ... |
| ... | ... | ... | ... | ... |

| TERMINAL | ANTENNA 12A | ANTENNA 12B | ANTENNA 12C | ANTENNA 12D |
|---|---|---|---|---|
| TERMINAL 1 | DIRECTIVITY A | DIRECTIVITY C | DIRECTIVITY A | DIRECTIVITY A |
| TERMINAL 2 | ... | ... | ... | ... |
| TERMINAL 3 | ... | ... | ... | ... |
| ... | ... | ... | ... | ... |

(A)

| TERMINAL | ANTENNA 12A | ANTENNA 12B | ANTENNA 12C | ANTENNA 12D |
|---|---|---|---|---|
| TERMINAL 1 | DIRECTIVITY A | DIRECTIVITY C | DIRECTIVITY C | DIRECTIVITY A |
| TERMINAL 2 | ... | ... | ... | ... |
| TERMINAL 3 | ... | ... | ... | ... |
| ... | ... | ... | ... | ... |

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2016-052910, filed on Mar. 16, 2016, the entire contents of which are incorporated herein by reference.

FIELD

Embodiments of the present invention relate to a wireless communication device and a wireless communication method.

BACKGROUND

A scheme has been proposed in which an access point has a plurality of antennas whose directivities are controlled for each terminal such that an RSSI (Received Signal Strength Indicator) in transmission to and reception from the terminal is improved. In this proposal, a characteristic for each combination of the directivities of the plural antennas is held as a list for each terminal. The list is obtained by performing a sounding of a channel during an unoccupied time. The antenna is controlled on the basis of this list. However, performing the sounding for each combination causes an overhead to increase.

On the other hand, a scheme has been proposed in which the antenna control period and an ordinary period are repeated and the directivity of the antenna is updated during the antenna control period.

BRIEF DESCRIPTION OF THE DRAWINGS

FIG. 9 shows diagrams showing an exemplary setting of the directivities for plural antennas for each terminal;

FIG. 11 shows diagrams showing an exemplary setting of the directivities for plural antennas for each terminal;

DETAILED DESCRIPTION

According to one embodiment, a wireless communication device includes controlling circuitry configured to adjust a directivity of each of a plurality antennas based on a received power of a first frame for each of the plurality of antennas; and a transmitter configured to transmit a second frame for responding to the first frame after the directivity is adjusted.

Hereinafter, embodiments of the present invention will be described with reference to the drawings. The entire contents of IEEE Std 802.11™-2012 and IEEE Std 802.11Ac™-2013, known as the wireless LAN specification are herein incorporated by reference in the present specification.

Figure 1:
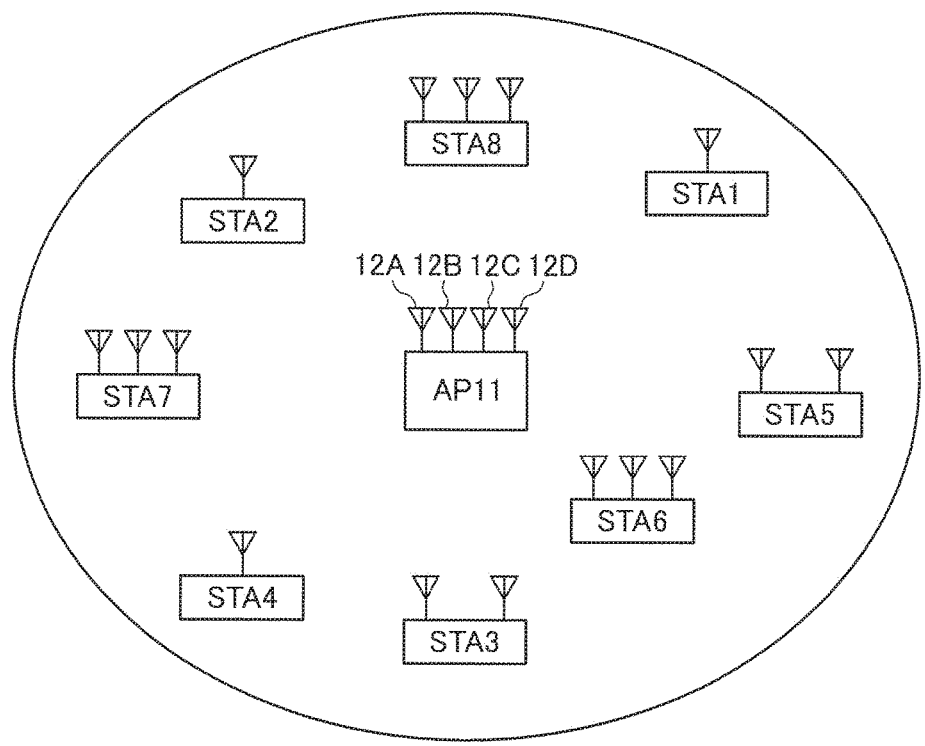
FIG. 1 is a diagram showing a wireless communication system according to an embodiment.

FIG. 1 is a configuration of a wireless communication system according to the embodiment. The wireless communication system includes an access point (AP: Access Point) 11 which is a base station, and wireless communication terminals 1 to 8 which are not base stations. The wireless communication terminals may be referred to as terminals, users, wireless terminals, or stations (STA) in some cases. The access point 11 is also one form of terminal, except for having a relay function, since it has the functions of a terminal. The access point 11 includes a plurality of antennas 12A, 12B, 12C, and 12D. Each of the terminals 1 to 8 includes one or more antennas.

The access point 11 and the terminals 1 to 8 wirelessly communicate with each other in accordance with any wireless communication scheme. As an example, the communication complying with the IEEE802.11 standard is carried out. A wireless communication device equipped in the terminal communicates with a wireless communication device equipped in an access point. The wireless communication device equipped in the access point communicates with the wireless communication device equipped in the terminal.

A wireless LAN based on the IEEE802.11 standard is assumed for the wireless communication system in the embodiment without limitation. The IEEE802.11 standard may refer to any of IEEE802.11b, IEEE802.11a, IEEE802.11n, IEEE802.11ac, and IEEE802.11ax that is a next generation wireless LAN standard, or those other than these.

The access point 11 periodically transmits a beacon frame in order to notify attribute information concerning itself. Each terminal can receive this beacon frame in order to grasp presence of the access point 11, for example. All or a part of the terminals 1 to 8 connect with the access point 11 to form a wireless communication group (BSS: Basic Service Set) between the terminal and the access point 11. The connection means a state where a wireless link is established, and a parameter required for the communication is completely exchanged by way of the association process with the access point so as to establish the wireless link. The terminal establishing the wireless link has an Association ID (AID) allocated from the access point. The AID is an identifier given in the association process which is performed between the terminal and the access point in order that the terminal belongs to the BSS of the access point.

More specifically, in a case where the access point authorizes the terminal that transmitted a connection request (Association Request) frame to connect therewith, it allocates a number which is generated locally in the relevant network to the terminal. The number is what is called the AID, and a certain number in a specified range other than 0 is allocated. The AID is allocated so as to be unique in that network (BSS). The AP transmits a connection response (Association Response) frame containing the allocated AID to the terminal which is to be authorized to connect therewith. The terminal grasps its AID by reading out the AID from the connection response frame. The terminal receives the connection response frame for the connection authorization from the access point to be able to belong to the BSS formed by the access point and thereafter communicate with the access point. Such a process for connection between the access point and the terminal is called an association process. The AP may perform an Authentication process before the association process with the terminal. The access point can identify the terminal connected with itself by means of the AID or a MAC address.

FIG. 2(A) illustrates the basic exemplary format of the MAC frame. The data frame, the management frame, and the control frame in accordance with this embodiment are based on a frame format as shown in FIG. 2(A). This frame format includes the fields of MAC header, Frame body, and FCS. The MAC header includes, as illustrated in FIG. 2(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 2 may exist. For example, an Address 4 field may further exist. The HT control field can be extended to a VHT (Very High Throughput) control field in IEEE 802.11ac or an HE (High Efficient) control field in IEEE 802.11ax which is a next-generation wireless LAN standard.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

As described above, two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a RTS (Request to Send) frame, CTS (Clear to Send) frame, a BA (Block Ack) frame or a BAR (Block Ack Request) frame within the control frame, or as to whether it is a beacon frame, an association request frame or an association response frame within the management frame is made by the Subtype field.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector).

The QoS control field is used to carry out QoS control to carry out transmission with the priorities of the frames taken into account. The QoS control field includes a TID field (16 types from 0 to 15) in which an identifier is set for data traffic, and an Ack policy field in which an acknowledgement scheme is set and the like. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT control field is a field introduced in IEEE 802.11n. The HT (High Throughput) control field is present when the Order field is set to 1 for QoS data frame or a management frame. As stated, the HT control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

Figure 5:
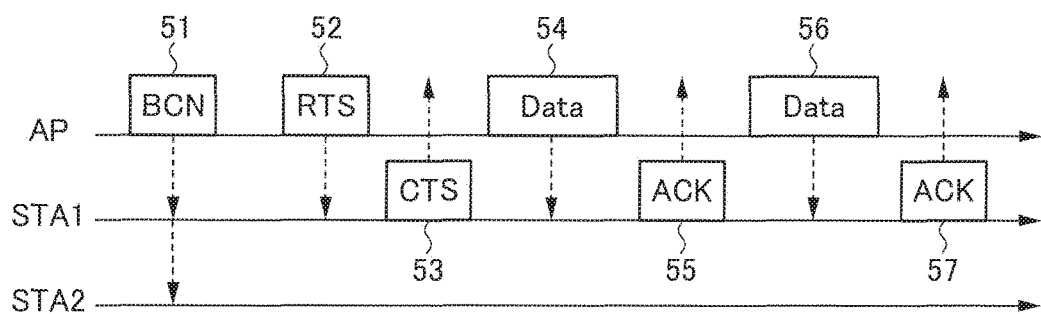
FIG. 5 shows an exemplary sequence of an operation according to the embodiment.

In the management frame, an information element (Information element; IE) to which a unique Element ID (IDentifier) is assigned is set in the Frame Body field. One or a plurality of information elements may be set in the frame body field. The information element has, as illustrated in FIG. 5, the fields of an Element ID field, a Length field, and an Information field. The information element is discriminated by the Element ID. The Information field is adapted to store the content of the information to be notified, and the Length field is adapted to store the length information of the information field. In the management frame, one or more predefined fields may be arranged depending on the frame type (Subtype) other than the information element.

Frame check sequence (FCS) information is set in the FCS field as a checksum code for use in error detection of the frame on the reception side. As an example of the FCS information, CRC (Cyclic Redundancy Code) may be mentioned.

Here, the frame transmitted by the access point and the frame transmitted by the terminal each actually have a physical header (PHY header) added to a head of the frame, and a physical packet including the physical header and the frame is transmitted. The physical packet may be referred to as the physical frame.

Figure 4:
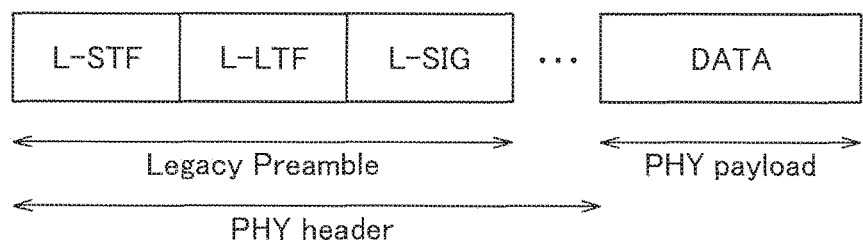
FIG. 4 is a diagram showing an exemplary structure of a physical packet.

FIG. 4 shows an exemplary format of the physical packet. The physical packet includes the physical header and a PHY payload. The physical header contains a Legacy Preamble part and a Preamble part depending on various standards such as 11n, 11ac, 11ax or the like. The PHY payload is a data part and contains a frame having been subjected to a modulation process. The Legacy Preamble has the same structure as the physical header defined by the IEEE802.11a and contains fields of an L-STF, an L-LTF, and an L-SIG. The L-STF or the L-LTF represents a known bit pattern. These are used for a device on the reception side to carry out reception gain adjustment, timing synchronization, channel estimation and the like. The L-SIG includes information for calculating by the device on the reception side a time required for transmitting the subsequent Preamble part and PHY payload.

Figure 2:
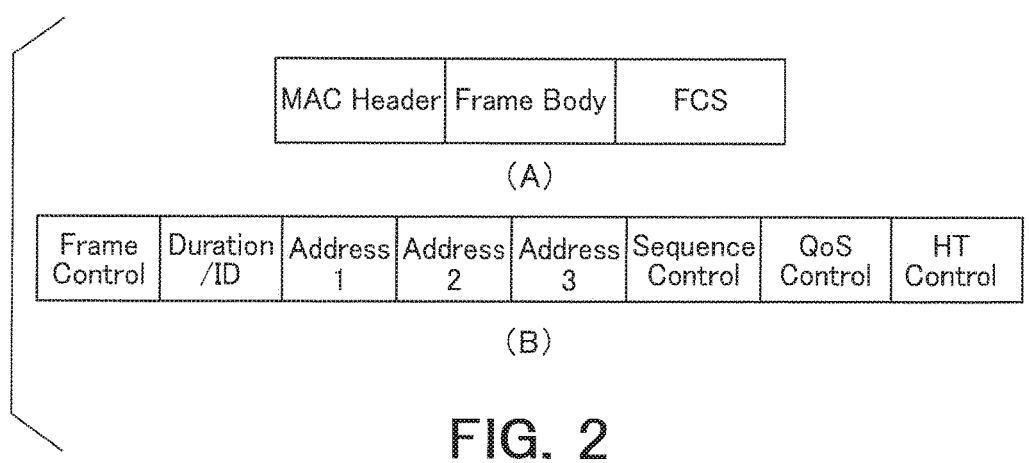
FIG. 2 shows diagrams showing an exemplary format of a MAC frame according to the embodiment.
Figure 3:
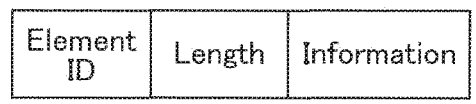
FIG. 3 is a diagram showing an exemplary format of an information element.

FIG. 5 shows an exemplary sequence of an operation according to the embodiment. In the figure, the access point (shown as AP in the FIG. 11 and the terminals (shown as STAs in the FIGS. 1 and 2 are shown. More terminals may exist in fact, and the terminal 2 may not exist. Signals (frames) transmitted by the access point 11 and the terminal 1 are depicted as rectangles. An abscissa is a temporal axis. The right direction in the figure is an advancing direction of time. Broken lines with arrows are directed to a destination to which a frame is transmitted.

A description is given of a basic sequence based on FIG. 5, and thereafter, the operation of the access point 11 is described in detail.

The access point 11 periodically transmits a beacon frame 51. An RA of the beacon frame 51 is a broadcast address, and a TA is a BSSID of the access point 11 (i.e., a MAC address of the access point 11). In order to transmit the beacon frame 51, an access right to a wireless medium is acquired in accordance with CSAM/CA. In other words, the access point 11 performs carrier sense between a backoff time determined at random and a fixed time period, and determines that the wireless medium is idle if a CCA (Clear Channel Assessment) value is equal to or less than a threshold. By doing so, the access point 11 acquires the access right to the wireless medium. Here, as the fixed time period, a PIFS (Point coordination function (PCF) InterFrame Space) may be used. The PIFS is an interframe space (IFS) used to acquire an access with a priority in the CSMA/CA. The PIFS is an example, and another time (IFS) may be used so long as it is a predetermined time period. A DIFS (Distributed coordination function InterFrame Space), an AIFS (Arbitration InterFrame Space), and a SIFS (Short InterFrame Space) which are described elsewhere herein are similarly example, and another time may be used.

The access point 11 has in an internal buffer thereof a plurality of data frames for the terminal 1. The access point 11 performs, in order to acquire the access right to the wireless medium, the carrier sense between the backoff time determined at random and the fixed time period, and determines that the wireless medium is idle if the CCA value is equal to or less than a threshold. By doing so, the access point 11 acquires the access right to the wireless medium.

There, the fixed time period is the DIFS (Distributed coordination function InterFrame Space)/AIFS (Arbitration InterFrame Space). The DIFS/AIFS means any one of the DIFS and the AIFS. In a case of not QoS compliant the DIFS is meant, and in a case of QoS compliant the AIFS is meant which depends on an access category (AC) of the transmitted data.

Once the access point 11 acquires the access right to the wireless medium, it transmits an RTS (Request to Send) frame 52 in which a Duration/ID field is set with a medium reservation time (NAV period) length required for burst transmission of the plural frames. The RTS frame is a frame requesting a receiving device to give authorization of frame transmission. An RA of the RTS frame 52 is a MAC address of the terminal 1, and a TA is the BSSID of the access point 11.

Once the terminal 1 receives the RTS frame 52, if this timing is within the period set in the Duration/ID field of the RTS frame 52, it transmits a CTS frame (Clear to Send) 53 after elapse of the SIFS from the completion of receiving the RTS frame 52. The CTS frame 53 is a frame that gives authorization of frame transmission to the device that transmitted the RTS frame 52. An RA of the CTS frame 53 is the access point 11, and a TA may not exist. The Duration/ID field of the frame received or transmitted thereafter within the period which is set in the Duration/ID field of the RTS frame is set by subtracting a value corresponding to such as a time period required for transmitting the frame from the Duration/ID field of the last received frame.

The RTS frame 52 transmitted from the access point 11 is also received by the terminal 2 which exists in the same BSS. The terminal 2 sets a NAV during a period set in the Duration/ID field because the received frame is not for it. During the NAV period, the terminal 2 restrains or prohibits the frame transmission.

Once the access point 11 receives the CTS frame 53, it transmits a data frame 54 after elapse of the SIFS. An RA of the data frame 54 is the terminal 1, and a TA is the BSSID of the access point 11.

The terminal 1 checks whether or not the reception is succeeded on the basis of the FCS information (such as the CRC) of the data frame 54, and transmits an acknowledgement response frame (ACK frame in the FIG. 55 to the terminal after elapse of the SIFS if determining the reception is succeeded. If the reception is failed, the ACK frame is not returned.

The data frame 54 may be an aggregation frame in which the plural data frames are aggregated (such as an A-MPDU (medium access control (MAC) protocol data unit)). Each of the frames contained in the aggregation frame may be referred to as a subframe. In a case of transmitting the aggregation frame, an acknowledgement response frame that is a response thereto is the BA frame including acknowledgement information with respect to each subframe.

Once the access point 11 receives the acknowledgement response frame 55 from the terminal 1, it transmits a data frames 56 after elapse of the SIFS from the completion of the receiving. The terminal 1 receives the data frame 56, carries out the check on the basis of the FCS information, and returns an acknowledgement response frame (ACK frame in the FIG. 57 depending on a check result. Subsequently, transmission of the data frame and reception of the acknowledgement response frame are repeated similarly.

Here, the access point 11 can efficiently perform antenna directivity control in this sequence to efficiently communicate with the terminal 1. Hereinafter, a description is given of this.

A plural directivities are settable for each of four antennas 12A to 12D included in the access point 11. Each of the antennas 12A to 12D has a plurality of branches, and an impedance or resistance of each branch can be controlled to individually control the directivities of the antennas 12A to 12D. For example, a plurality of impedance setting patterns for four branches can be prepared to control the directivities by switching the setting patterns. So long as the directivities of the antennas can be individually controlled, an antenna structure may be arbitrary without limitation to those described above. Four antennas are assumed to have the same structure (each is an antenna having four branches), but so long as their directivities can be controlled to desired directions, respective antennas may have structures different from each other.

Figure 6:
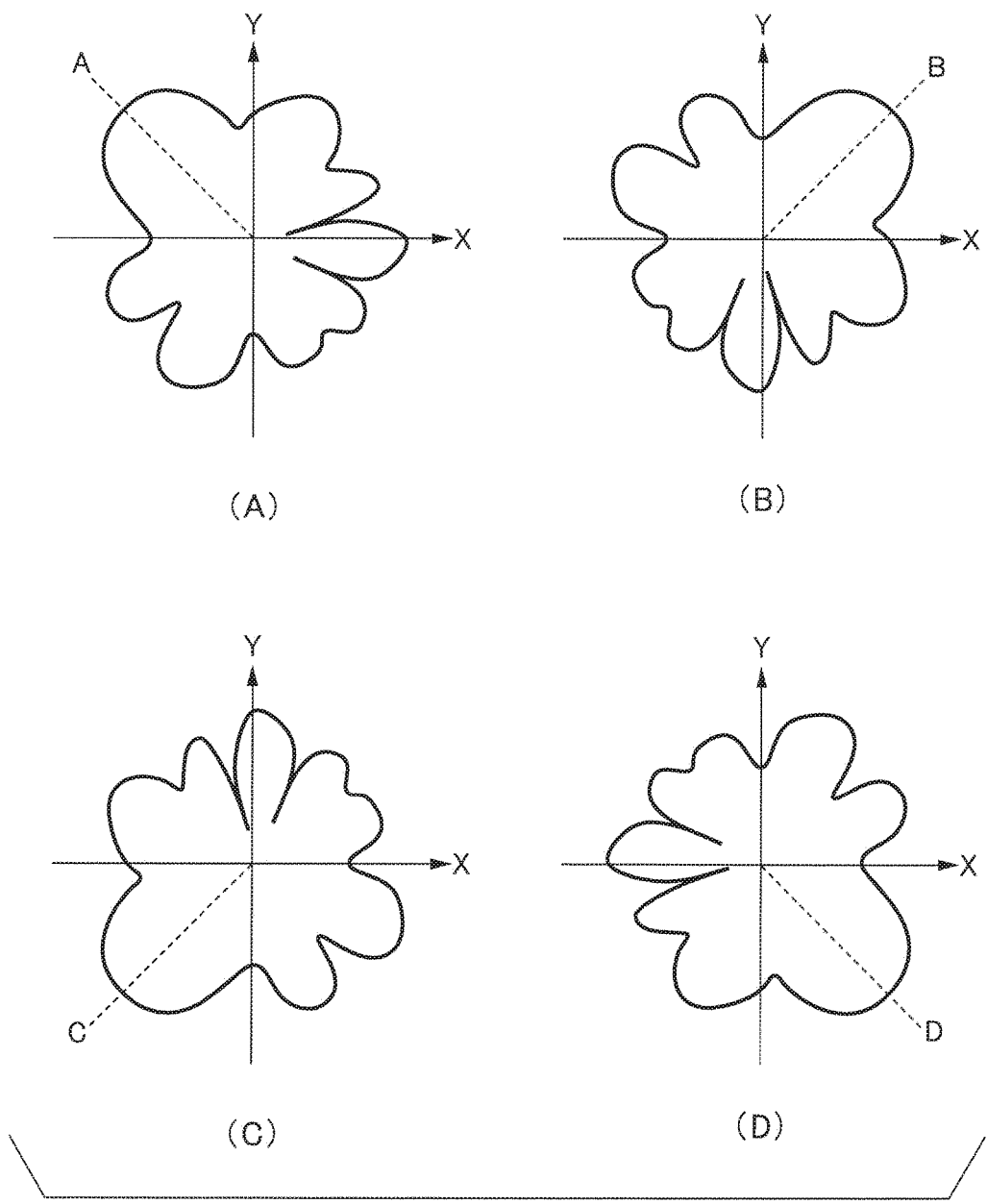
FIG. 6 shows diagrams showing exemplary images of four directivities.

FIGS. 6(A) to 6(D) show diagrams of exemplary images of directivities. FIG. 6(A) shows an exemplary pattern of a directivity (directivity A) oriented to a direction A that is positive along a Y-axis and negative along an X-axis. FIG. 6(B) shows an exemplary pattern of a directivity (directivity B) oriented to a direction B that is positive along the Y-axis and positive along the X-axis. FIG. 6(C) shows an exemplary pattern of a directivity (directivity C) oriented to a direction C that is negative along the Y-axis and negative along the X-axis. FIG. 6(D) shows an exemplary pattern of a directivity (directivity D) oriented to a direction D that is negative along the Y-axis and positive along the X-axis. The antenna can have the directivity of any of the directions A to D by switching the impedance settings for four branches. In other words, each antenna is provided with an impedance setting pattern A corresponding to the directivity in the direction A, an impedance setting pattern B corresponding to the directivity in the direction B, an impedance setting pattern C corresponding to the directivity in the direction C, and an impedance setting pattern D corresponding to the directivity in the direction D. The impedance setting patterns A to D are switched to allow the directivities A to D to be switched. Each of the examples of the directivities shown in FIGS. 6(A) to 6(D) is an example, and more or less directivities may be defined. The directions of the directivities are not limited to those shown in FIGS. 6(A) to 6(D).

Figure 7:
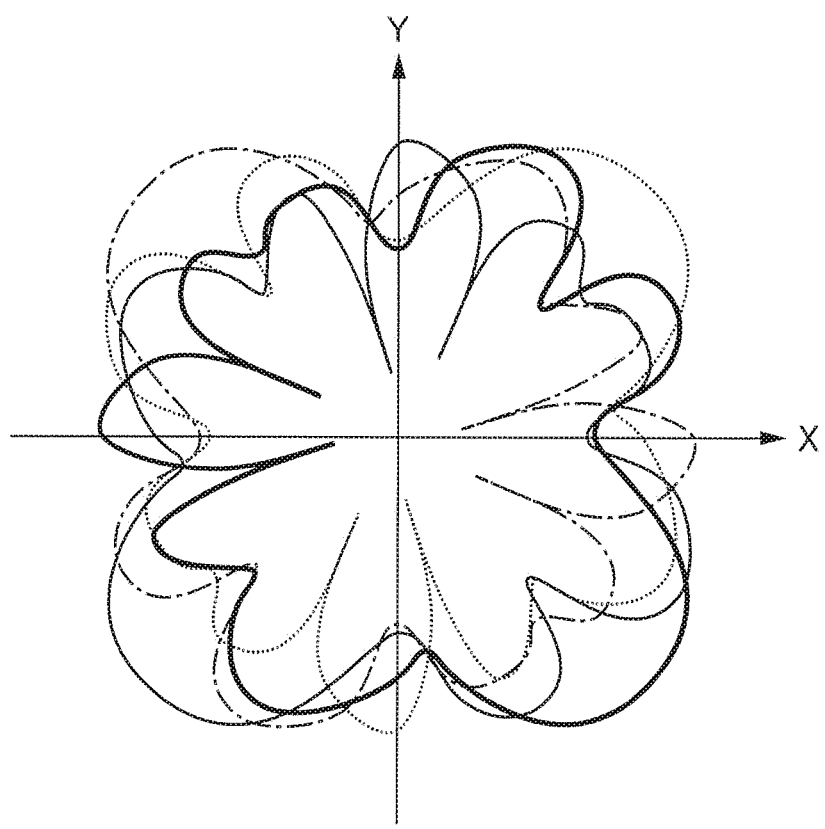
FIG. 7 is an image diagram having four directivities in FIG. 6 overlapping each other.

In a case where the directivities of four antennas are respectively set to the directivities A to D, a synthesis directivity is obtained in which the directivities A to D in FIGS. 6(A) to 6(D) overlap each other. FIG. 7 shows an image of the synthesis directivity having the directivities A to D overlapping each other. Overlapping directivities A to D can give a directivity in all directions (omnidirectional directivity) which covers all of the directions A to D. In other words, the directivities of four antennas can be respectively set to the directions A to D different from each other to give the omnidirectional directivity generally.

The directivities of four antennas can be variously combined. For example, if two antennas are set to have the directivity A, and two antennas are set to have the directivity B, communication quality with respect to the direction A and the direction B can be improved. This allows high quality communication to the terminal existing in the direction A, the direction B, or between these. If all of four antennas are set to have the directivity A, the communication quality in the direction A can be particularly improved. This allows high quality communication with the terminal existing in the direction A. In this way, the access point 11 attains the efficient communication by controlling the directivities of the antennas.

Here, the communication quality can be evaluated by, for example, an SNR (Signal to Noise Ratio), a RSSI (Received Signal Strength Indicator), an EVM (Error Vector Magnitude), a PER (Packet Error Rate), or the like. Each of the indicators for the communication quality described here is an example, and another indicator may be used.

Figure 8:
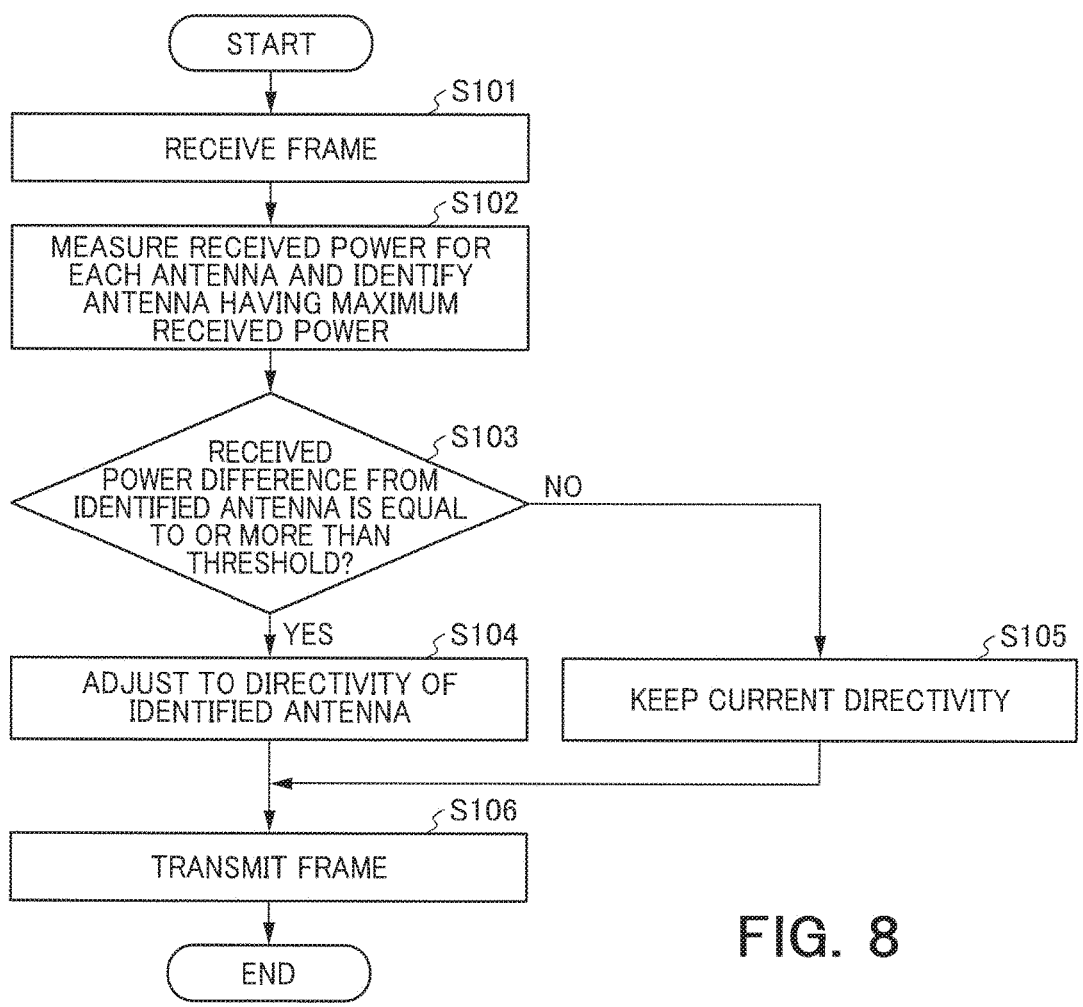
FIG. 8 is a diagram showing a flowchart of a first example of antenna directivity control performed by an access point.

FIG. 8 shows a flowchart of a first example of the antenna directivity control performed by the access point 11. In an initial state, the directivities of the antennas 12A to 12D of the access point 11 are set to give the omnidirectional directivity generally (such a setting pattern of the directivities of the antennas is referred to as a base pattern). In other words, the directivities of four antennas are respectively set to be oriented to the directions A to D. However, the initial state is not limited to this.

The access point 11 stores the directivities of each of the plural antennas for each terminal in a form of a table or the like as an example. FIGS. 9(A) and 9(B) show an example of the table. The access point stores identification information on the directivities of the plural antennas. As for the terminal 1, the antennas 12A to 12D are respectively set to the directivities in the directions A to D (i.e., the directivities A to D). The synthesis directivity of these is the omnidirectional directivity. The access point may set for each terminal the directivities of the antennas in accordance with the table. However, in a case where a predetermined operation is performed, such as in a case of the broadcast or multicast transmission, or in a case of transmitting a frame as a trigger to start the communication with the terminal, the respective antennas may be set to the base pattern to obtain the omnidirectional directivity (base pattern). When a certain condition is met such as when the communication individually with the terminal does not occur for a certain time period, the respective antennas may be returned to the base pattern.

Once the access point 11 receives a frame from the terminal (S101), it measures a received power of the received frame for each antenna (S102). The frame to be received may be any kind. Here, the CTS frame in the exemplary sequence in FIG. 5 is assumed, but the ACK frame may be used. Alternatively, other kinds of frames may be used. The received power may be based on the RSSI, the SNR, the received power itself, or other indexes. The access point 11 identifies the antenna having the highest received power (also at S102). The identified antenna is referred to as a maximum antenna.

A difference between the received power of the maximum antenna and that of each of other antennas (three antennas) is calculated respectively (S103).

The directivity of the antenna having the received power difference equal to or more than a threshold is adjusted to the directivity of the maximum antenna (S104). For example, in a case where the directivities in four directions A to D (directivities A to D) described above are present, if the directivity of the maximum antenna is the directivity A, the directivity of the antenna is also adjusted to the directivity A (the impedance setting for four branches the antenna has is made to correspond to the directivity A). Adjusting to the directivity A means that, of the plural directivities settable for the antenna, a directivity that is the same as or the closest to the directivity A is selected and set. Alternatively, there may include a case that a directivity of a direction that falls within a certain range with respect to the direction A is selected and set.

On the other hand, the antenna having the received power difference less than the threshold is made to keep the current directivity (S105).

The access point 11 updates the table in accordance with the content set at steps S104, and S105. FIG. 9(B) shows an example of the updated table. Here, all of three antennas other than the maximum antenna are determined to have the received power difference from the maximum antenna equal to or more than the threshold, and thus, three antennas other than the maximum antenna are set to be adjusted to have the directivity of the maximum antenna (here, the directivity A).

After performing the directional control (S104, S105), the access point transmits, after elapse of a certain time period from the completion of receiving the frame at S101, a frame responding to the received frame (S106). For example, if the frame received at step S101 is the CTS frame 53, the data frame 54 is transmitted as a frame responding to the frame 53. Alternatively, if the frame received at step S101 is the ACK frame 55, the data frame 56 that is a data frame to be transmitted next time is transmitted as a frame responding to the frame 55.

According to the operation in FIG. 8, the directivity of the antenna is adjusted on the basis of the received power of the frame received from the terminal for each antenna, and after the adjustment, a frame responding to the frame is transmitted, allowing the directivity to be efficiently adjusted. Therefore, the efficiency of the communication with the terminal can be improved.

Figure 10:
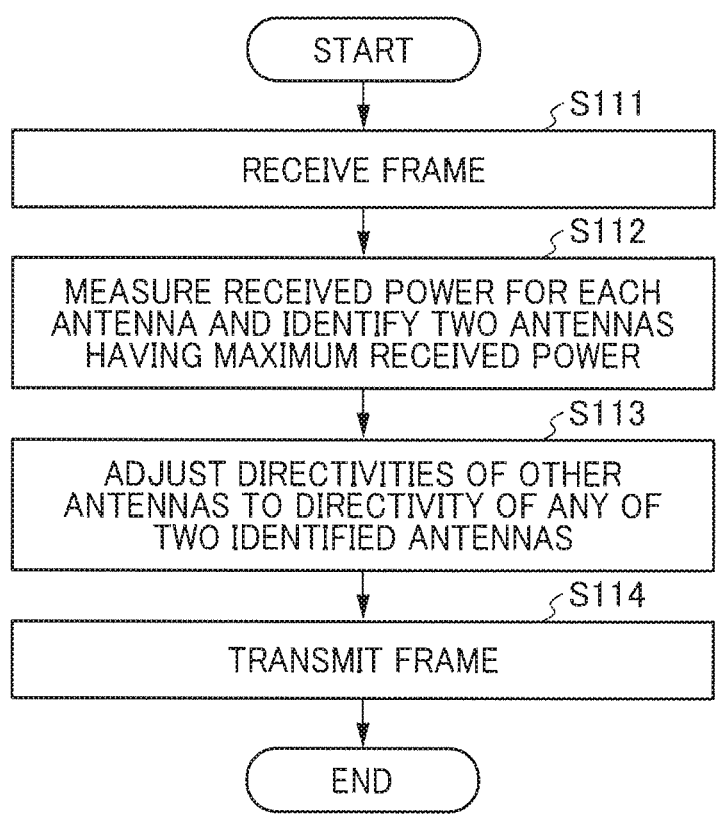
FIG. 10 is a diagram showing a flowchart of a second example of the antenna directivity control performed by the access point.

FIG. 10 shows a flowchart of a second example of the antenna directivity control performed by the access point 11. A description duplicating that for FIG. 8 is adequately omitted.

Once the access point 11 receives a frame from the terminal (S111), it measures a received power of the received frame for each antenna (S112). Top two antennas having the highest received power are identified (also at S112).

The directivities of all of the rest of the antennas other than two identified antennas are adjusted to the directivity of any one of two identified antennas (S113). The access point 11 updates the table in accordance with this content.

For example, if one of two identified antennas has the directivity A and the other has the directivity C, the directivity of each of the rest two antennas is adjusted to the directivity A or the directivity C.

As an example, both of the rest two antennas may be made to match the directivity of the same antenna. For example, if the identified antennas are the antennas 12A and 12B, and the directivities of them are the directivity A and the directivity C respectively, both the antennas 12C and 12D may be adjusted to have the directivity A of the antenna 12A. FIG. 11(A) shows an example of the table in a case of the setting like this.

Alternatively, the antennas to which the rest two antennas are adjusted may be different from each other. In other words, one of the rest two antennas is adjusted to have the directivity of one of two identified antennas and the other of the rest two antennas is adjusted to have the directivity of the other of two identified antennas. For example, if the identified antennas are the antennas 12A and 12B, and the directivities of them are the directivity A and the directivity C respectively, the antenna 12C is adjusted to have the directivity C of the antenna 12B and the antenna 12D is adjusted to have the directivity A of the antenna 12A. FIG. 11(B) shows an example of the table in a case of the setting like this.

After performing the directional control (S113), the access point transmits, after elapse of a certain time period from the completion of receiving the frame at S111, a frame responding to the received frame (S114).

Figure 12:
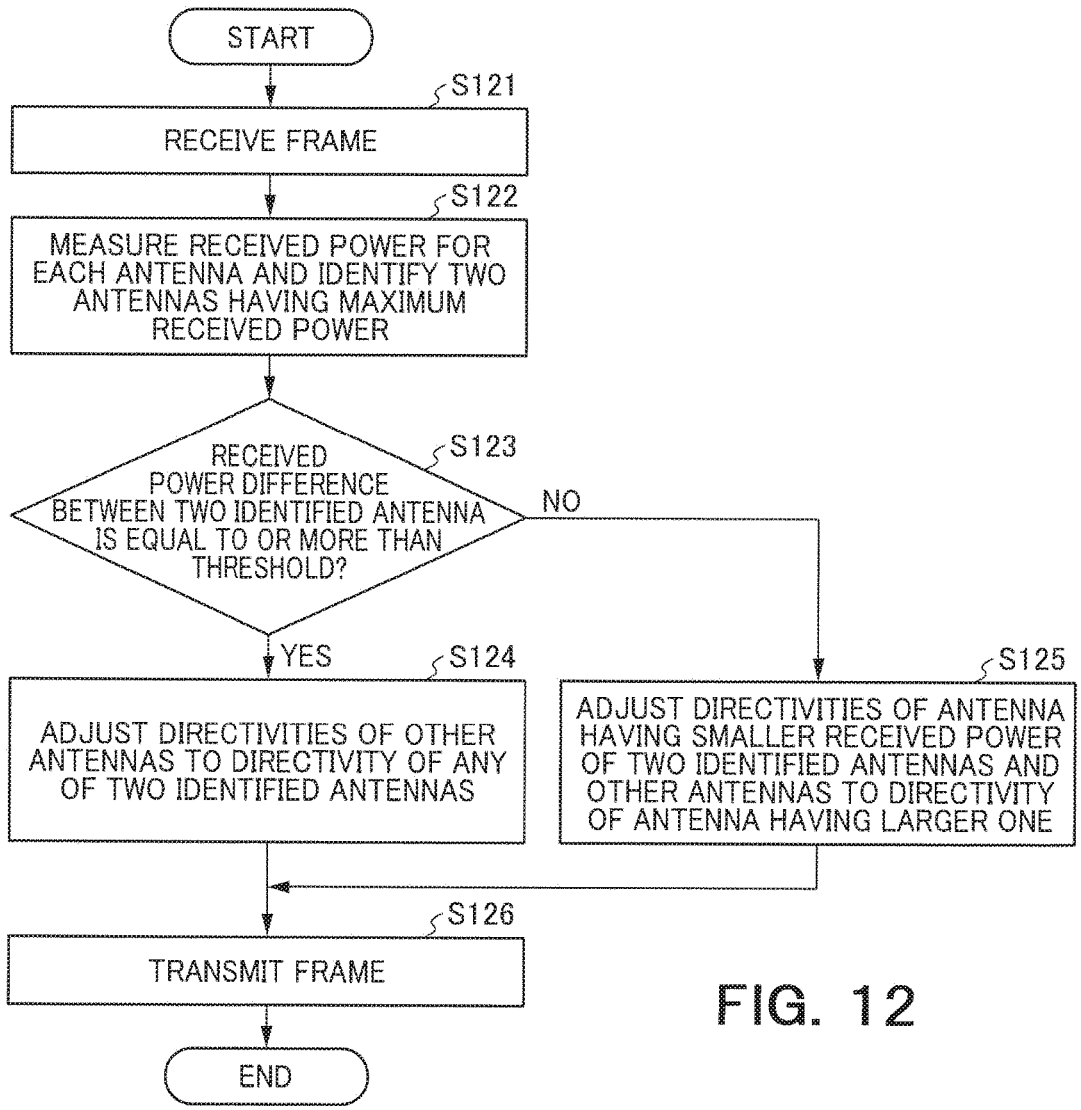
FIG. 12 is a diagram showing a flowchart of a third example of the antenna directivity control performed by the access point.

FIG. 12 shows a flowchart of a third example of the antenna directivity control performed by the access point 11.

Once the access point 11 receives a frame from the terminal (S121), it measures a received power of the received frame for each antenna (S122). Top two antennas having the highest received power are identified (also at S122).

Determination is made on whether or not the received power difference between two identified antennas is less than a threshold (S123).

If the difference is equal to or more than the threshold, the directivities of all of the rest of the antennas other than two identified antennas are adjusted to directivity of any one of two identified antennas (S124). This step is similar to step S113 in FIG. 10.

If the difference is less than the threshold, the antenna having smaller received power of two identified antennas and other antennas are adjusted to have the directivity of the antenna having larger received power of two identified antennas (S125). For example, if the directivity of the antenna having larger received power of the top two antennas is the directivity A, the directivities of the antenna having smaller received power and the rest two antennas are all adjusted the directivity A.

After performing the directional control (S124, S125), the access point transmits, after elapse of a certain time period from the completion of receiving the frame at S121, a frame responding to the received frame (S126).

The operations described above in FIG. 8, FIG. 10, and FIG. 12 may be performed, for example, in a case of receiving a predetermined frame such as the CTS frame, or every certain time period, or in a case where a predetermined condition is met. The operations may be performed also every time the frame is received from the terminal.

Figure 13:
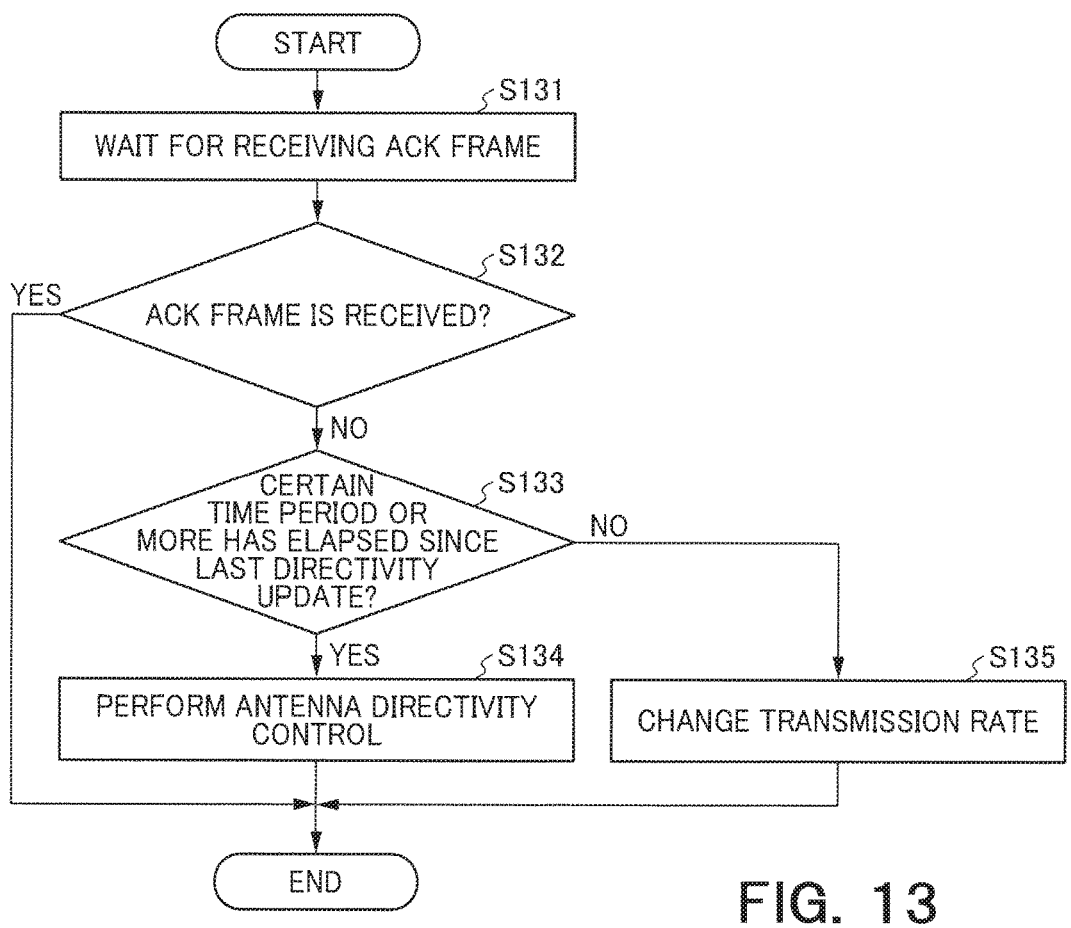
FIG. 13 is a diagram showing a flowchart of an exemplary operation of an access point.

FIG. 13 is a flowchart of an exemplary operation of the access point 11. This flow shows an operation in a case where the acknowledgement response frame is received. Here, assume the ACK frame.

After the access point 11 transmits the data frame (such as the data frame 54 or 56 in FIG. 5), it waits for receiving the acknowledgement response frame (such as ACK frame 55 or ACK frame 57 in FIG. 5) (S131).

In a case where the ACK frame is received (YES at S132), this flow ends. In a case where the ACK frame cannot be received (NO at S132), determination is made on whether or not a certain time period or more has elapsed since the last directivity update (S133). The case where the ACK frame cannot be received includes a case where, for example, the data frame cannot be normally received on the terminal side due to a CRC error or the like and the ACK frame is not transmitted.

If a certain time period or more has elapsed, the antenna directivity control is performed (S134). Specifically, the operation shown in any flowcharts of FIG. 8, FIG. 10, and FIG. 12 is performed. For example, in a case where the access point transmits the next data frame to the terminal and can receive its response ACK frame, it may handle the ACK frame as the frame received at the first step in the flowcharts in FIG. 8, FIG. 10, or FIG. 12 to perform the operation of the second and the subsequent steps. Alternatively, the RTS frame (see FIG. 5) may be transmitted again to receive the CTS frame as a response.

In a case where the antenna directivity control has never been performed after starting the communication with the terminal, the process at step S134 may be performed even if a certain time period has not elapsed.

In the circumstance where the antenna directivity control has never been performed, the directivity of each antenna with respect to the terminal has the base pattern. In other words, the synthesis of the directivities of the antennas is the omnidirectional directivity. Definition of a timing when the communication with the terminal is started may be arbitrarily determined. For example, a timing when the RTS frame is transmitted as a trigger to start the burst transmission may be used.

If it is determined at step S133 that a certain time period has not elapsed, a transmission rate for the frame to be transmitted to the terminal is changed (S135). Specifically, the transmission rate is lowered. As the transmission rate, for example, an MCS (Modulation and Coding Scheme) may be used. The MCS defines the transmission rate in accordance with a set of a modulation scheme and a coding rate. For example, there are the MCS using the modulation scheme of 16QAM and the coding rate of ¾, and the MCS using the modulation scheme of QPSK and the code rate of ⅓. Assume that there are nine MCSs MCS0, MCS1, MCS2, MCS3, MCS4, MCS5, MCS6, MCS7, and MCS8 which are applicable to the terminal, and the MCS8 is the highest in the transmission rate, and then, the transmission rate is smaller as its number is smaller in an order of the MCS7, the MCS6 . . . . . If the current MCS for the terminal is the MCS8, it is changed to the MCS7 or less. The MCS0 to MCS8 may be the MCSs the same as those represented in accordance with the definition based on the IEEE802.11, or may be those defined differently from these.

Figure 14:
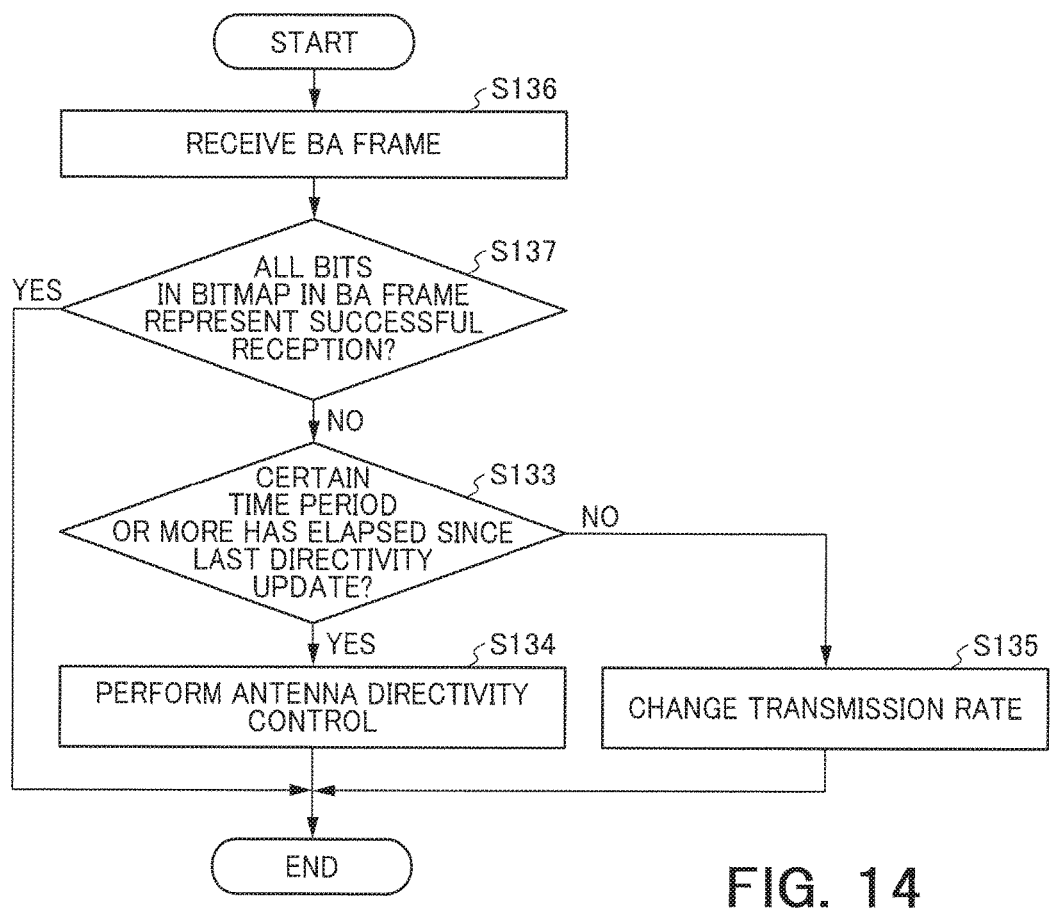
FIG. 14 is a diagram showing a flowchart of another exemplary operation of the access point.

FIG. 14 shows a flowchart of another exemplary operation of the access point 11. The example in FIG. 13 shows the case of the ACK frame as the acknowledgement response frame, but here is shown a case of the BA frame. Steps S133, S134, and S135 are the same as those in FIG. 13, description of which is omitted.

After the access point 11 transmits the data frame (here, the aggregation frame containing the plural subframes), it receives the acknowledgement response frame (here, the BA frame) (S136). If the BA frame cannot be received, the process may be performed which is the same as in the case where the ACK frame in FIG. 13 cannot be received.

The access point 11 determines based on a bitmap in the BA frame whether or not the terminal successfully receives the plural subframes contained in the aggregation frame, that is, whether or not the access point 11 successfully transmits the plural subframes (S137). If the bitmap represents that the all subframes are successfully transmitted, this flow ends. If any one of the subframes fails to be transmitted, the process goes to step S133. The subsequent process is the same as in FIG. 13.

The determination at S137 is made on whether or not the all subframes are successfully transmitted, but another method may be used. For example, if the number of the subframes, of the all subframes, failing to be transmitted is equal to or less than a threshold, this flow may end, and if more than the threshold, the process may go to step S133. Alternatively, if a certain ratio or more, or the certain number or more of the subframes, of the all subframes, are successfully transmitted, this flow may end, otherwise the process may go to step S133. Other method than those described here may be used.

Figure 15:
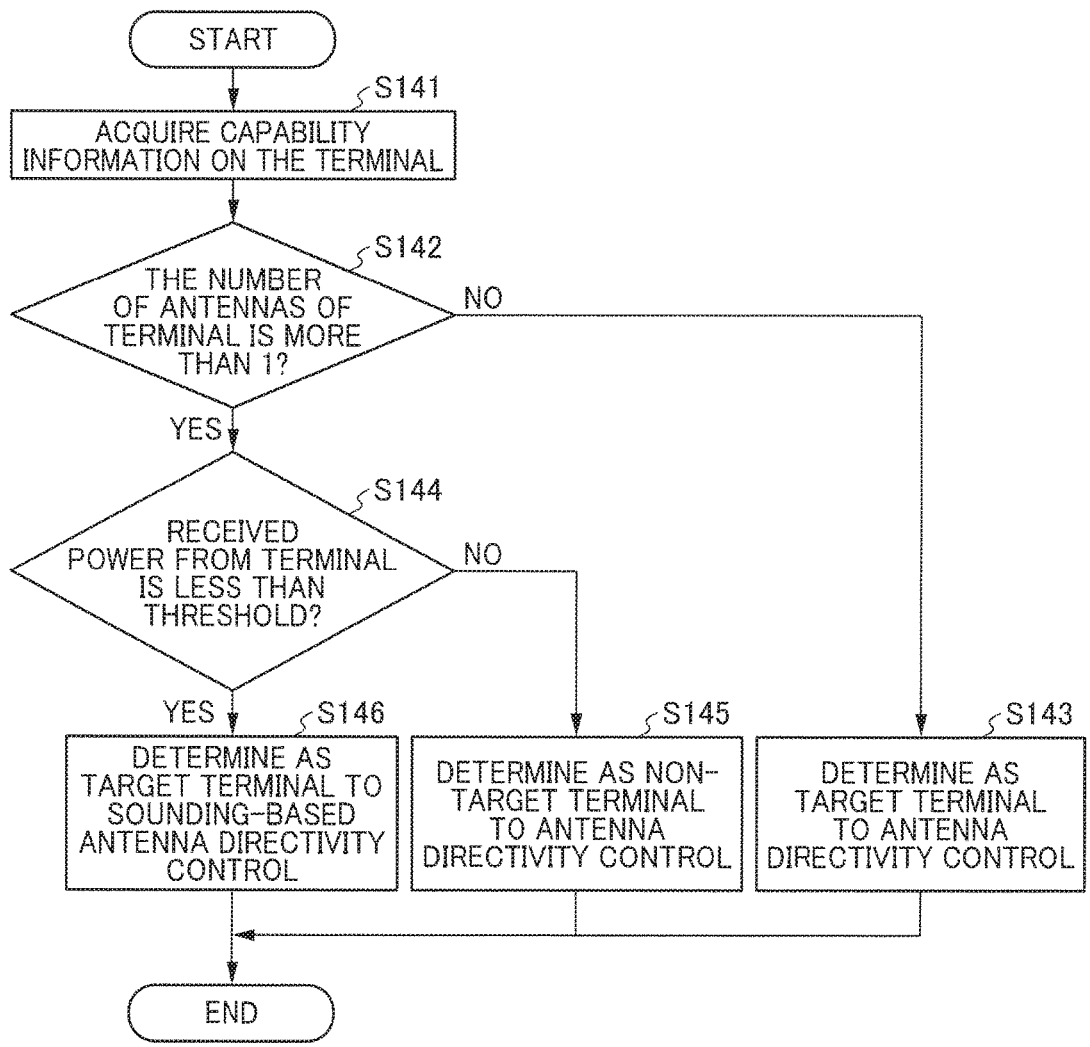
FIG. 15 is a diagram showing a flowchart of a still another exemplary operation of the access point.

It may be such that determination is made on whether or not the antenna directivity control is performed with respect to the terminal depending on the configuration or capability of the terminal so that the antenna directivity control is performed on only the terminal which is determined to be subjected to the control. FIG. 15 shows a flowchart of an operation to determine the terminal.

The access point acquires capability information from the terminal (S141). An acquisition method of the capability information may be arbitrary. For example, the terminal may make an association response include the capability information at the association process. Alternatively, the access point may transmit a frame requesting to transmit the capability information or the like to the terminal, and the terminal may transmit as a response thereto a frame including the capability information. A kind of the frames may be the management frame described above or the data frame. The terminal has the capability information containing the number of antennas provided to the terminal, information on whether to deal with beam forming, or both of these. The beam forming is a technology in which a plurality of antennas are used to transmit a radio wave (beam) having the directivity such that the communication quality is improved. If the number of the provided antennas is one, the beam forming cannot be performed. Even if the number of the provided antennas is two or more, the beam forming may be possible or not depending on the capability or setting of the terminal.

The access point identifies the number of antennas provided to the terminal on the basis of the acquired capability information. If the number of antennas is one (NO at S142), the terminal has no chance of the beam forming, and thus, the terminal is determined to be subjected to the antenna directivity control (S143). In other words, the access point determines the terminal to be subjected to the processes in FIG. 8, FIG. 10, and FIG. 12 to FIG. 14.

If the number of antennas provided to the terminal is two or more, the communication quality of a channel to the terminal is determined (S144). Here, as the communication quality, determination is made on whether or not the received power from the terminal is less than a threshold. The received power may be the received power of the frame containing the capability information or a received power of a frame received in another communication. The received power may be a total, maximum, or average value of the received powers of the plural antennas provided to the access point. At this time, the plural antennas are set to have, for example, the base pattern (i.e., the synthesis omnidirectional directivity). As the communication quality, the RSSI, the SNR or the like may be used.

If the received power from the terminal is equal to or more than the threshold (in a case where the terminal exists at a short distance, or the like) (NO at S144), the terminal is determined to not be subjected to the antenna directivity control (S145). In other words, when the access point communicates with the terminal, it keeps the setting of each of the plural antennas to be the base pattern (i.e., the synthesis omnidirectional directivity). The reason for this is described as below. In a case where the terminal is provided with two or more antennas, the frame may possibly be transmitted by way of the beam forming to the access point. If the terminal uses the beam forming, symmetry of transmission and reception channels with the access point cannot be ensured. For this reason, if the access point 11 performs the antenna directivity control on the basis of the received power, the efficient communication may not be possibly attained. For this reason, such a terminal is not subjected to the antenna directivity control and communicated using the omnidirectional directivity.

On the other hand, if the received power from the terminal is less than the threshold (in a case where the terminal exists at a long distance, or the like) (YES at S144), the terminal is determined to be subjected to sounding-based antenna directivity control (S146). In other words, the sounding is performed to the terminal for the all combinations of the directivities of the plural antennas of the access point or the combinations except for one or some of the all combinations of the directivities to employ the best combination of the directivities (the antenna directivity control illustrated in FIG. 8, FIG. 10, and FIG. 12 to FIG. 14 is not performed). For example, the combination which gives the highest reception characteristic in the terminal is employed. This increases the overhead, but the received power from the terminal is low and high quality communication is possible even if the terminal performs the beam forming. In the sounding, the frame including the known signal is transmitted, and the terminal calculates variation information on an amplitude and phase on the basis of the known signal. A response frame containing the calculated variation information on the amplitude and phase is returned to the access point. The access point selects the combination of the directivities of the antenna having the good reception characteristic on the basis of the variation information. As an example, a method may be used in which the combination having the smallest attenuation amount of the amplitude is selected. A method also may be used in which both the attenuation amount of the amplitude and a phase variation amount are taken into consideration to calculate an evaluation value to select the combination having the highest evaluation. Other method than those described here may be used.

The operation flow shown in FIG. 15 is an example, and a part of the operation may be modified. For example, at step S143, a free region condition of a wireless channel to be used is checked and if an occupancy rate of the wireless channel is low, the terminal may be determined to be a target terminal to the sounding-based antenna directivity control. Additionally, a step may be added between steps S142 and S144, in which a free region condition of a wireless channel to be used is checked and if an occupancy rate of the wireless channel is low, the terminal is determined to be a target terminal to the sounding-based antenna directivity control. The occupancy rate of the wireless channel may be calculated on the basis of, for example, a ratio of an idle time to a busy time which is obtained by performing the carrier sense at the wireless channel for a certain time period. The calculation may be performed in other ways.

Figure 16:
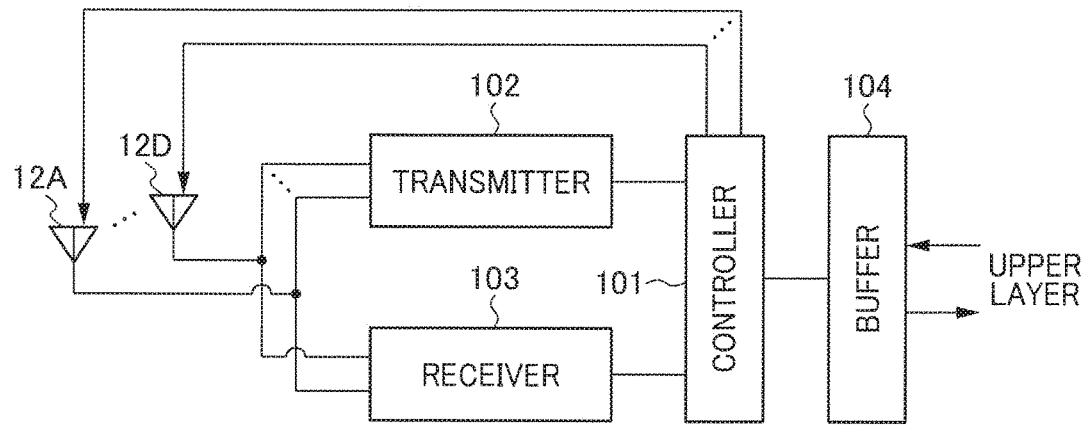
FIG. 16 is a functional block diagram of a wireless communication device installed in an access point.

FIG. 16 is a functional block diagram of the wireless communication device in the access point. The wireless communication device in the access point 11 includes antennas 12A, 12B, 12C and 12D, a controller 101, a transmitter 102, a receiver 103, and a buffer 104. The number of the antennas is four although the number may be one or more.

Each of the antennas 12A to 12D can be set to have a plurality of directivities (see FIG. 6(A) to FIG. 6(D)). The directivity setting is performed by a controller 101. The controller 101 switches the impedance settings for four branches of each antenna to switch the directivities of each antenna.

The controller 101 corresponds to controlling circuitry or a baseband integrated circuit which controls communication with the terminals, and the transmitter 102 and the receiver 103 form a wireless communicator or an RF integrated circuit which transmits and receives frames via the antenna as an example. A process of the controller 101, and all or a part of a digital region process of the transmitter 102 and the receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and the receiver 103.

The buffer 104 is a storage for transferring a frame, data or the like between an upper layer and the controller 101. The buffer 104 may be a volatile memory such as a DRAM or a non-volatile memory such as a NAND, or an MRAM.

The upper layer may store the frame received from another network in the buffer 104 for relaying to the network in the terminal side, or takes in, from the controller 101, the frame received from the network or a payload thereof via the buffer 104. The upper layer may perform an upper communication process than a MAC layer such as a TCP/IP or a UDP/IP. Alternatively, the TCP/IP or a UDP/IP may be performed in the controller 101 and the upper layer may also perform a process of an application layer of processing the data upper than TCP/IP or a UDP/IP. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer. The controller 101 transmits and receives the frame (more specifically, a physical packet having a physical header added to the frame) via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the terminal, performs an association process to exchange required information on capability or an attribute etc. each other and establishes the wireless link with the terminal. The controller 101 may perform a process such as an authentication process if necessary before receiving the association request. The controller 101 may acquire information concerning, as capability information of the terminal, information on the number of antennas provided with the terminal or information as to whether to be compliant with beam forming, and the like. The capability information may be acquired as a response to transmission of a request to transmit the capability information when not at the association process but at any timing after that.

The controller 101 periodically checks the buffer 104 to confirm the state of the buffer 104 such as existence or non-existence of data for downlink transmission. Alternatively, the controller 101 may check the state of the buffer 104 according to a trigger given from an external device as such the buffer 104.

The controller 101, when transmitting the frame (more specifically, the physical packet having the physical header added to the frame), as an example, performs the carrier sensing in accordance with the CSMA/CA before the transmission, and if a carrier sensing result shows being idle (if a value of the CCA is equal to or less than a threshold), the access right to the wireless medium is acquired. The controller 101 subjects the frame to processes such as encode and a modulation process based on the MCS to output to the transmitter 102. The transmitter 102 subjects the input frame (more specifically, the physical packet having the physical header added thereto) to DA conversion, a filtering process to extract components of a desired band, frequency conversion (up-conversion) and the like to amplify signals obtained through these processes by a pre-amplifier and radiate the amplified signals as radio waves from the plural antennas into the space. In order to reserve the wireless medium for a certain time period to perform the burst transmission to the terminal, the controller 101 may transmit the RTS frame having the Duration/ID field set with an occupied period of the wireless medium.

The signal received by each antenna in the access point is processed in the receiver 103 for each reception system corresponding to the each antenna. The received signal of each antenna is amplified by a low noise amplifier (LNA) in the corresponding reception system, is subjected to frequency conversion (down-convert), and is subjected to a filtering process, thereby allowing a desired band component to be extracted. Each extracted signal is further converted into a digital signal through AD conversion and a resultant packet is input to the controller 101. The digital signals in the reception systems are synthesized by a diversity technique to acquire the packets. The synthesis may be performed in a state of analog signals before converted to the digital signals.

The controller 101 subjects the received packet to processes such as demodulation and error-correcting decode to acquire the frame to carry out CRC check of the frame (in a case of the aggregation frame, the CRC check is carried out for the plural data frames in the aggregation frame). The controller 101 transmits the acknowledgement response frame (more specifically, the packet having the physical header added thereto) after elapse of a predefined time period from the completion of receiving the frame from the terminal. In a case where the frame is the aggregation frame, the acknowledgement response frame is the BA frame. The transmitter 102 subjects the acknowledgement response frame to DA conversion, a filtering process to extract components of a desired band, frequency conversion (up-conversion) and the like to amplify signals obtained through these processes by a pre-amplifier and radiate the amplified signals as radio waves from the plural antennas into the space.

The controller 101 may use the capability information of the terminal to determine the terminal as any of the target terminal to the antenna directivity control (see step S143 in FIG. 15), the non-target terminal to the antenna directivity control (see step S145), and the target terminal to the sounding-based antenna directivity control (see step S146).

The controller 101 controls the directivities of the antennas with respect to the target terminal to the antenna directivity control in accordance with the operation flows shown in FIG. 8, FIG. 10, and FIG. 12 to FIG. 14, efficiently performing the communication. Specifically, the controller 101 measures the received power of the frame received from the terminal for each antenna, and performs the operation in accordance with any flow in FIG. 8, FIG. 10, and FIG. 12 to FIG. 14 on the basis of the measured received power. The received power is measured on the basis of the known signal included in the packet. For example, an L-STF, L-LTF or L-SIG in the physical header of the packet may be used. A training field of the Preamble part depending on various standards such as 11n, 11ac, or 11ax may be used.

The controller 101 switches the directional control of the antennas 12A to 12D and control of the transmission rate with respect to the target terminal to the antenna directivity control in accordance with the operation flow shown in FIG. 13 or FIG. 14. As for an initial transmission rate applied to the terminal, for example, the MCS for the maximum rate of the MCS set (plural MCSs) available to the terminal may be used as the initial transmission rate. Alternatively, the communication quality with the terminal (SNR, SINR, or the like) may be measured to determine the initial transmission rate depending on the measured communication quality. The initial transmission rate may be determined in other ways.

The controller 101 keeps the directivities of the antennas 12A to 12D in the base pattern with respect to the non-target terminal to the antenna directivity control. Since this allows the synthesis of the directivities of the antennas to be the omnidirectional directivity, the communication with the non-target terminal is performed using the omnidirectional directivity.

The controller 101 performs the sounding to the terminal with respect to the target terminal to the sounding-based antenna directivity control for the all combination of the directivities of the antennas 12A to 12D. In the sounding, the packet including the known signal is transmitted to the terminal, the variation information on the amplitude and the variation information on the phase are calculated on the terminal side, and a response packet including the calculated variation information (downlink channel information) is returned to the access point 11. The controller 101 selects the combination having the highest communication quality on the basis of the variation information for each combination. The controller 101 may cause the terminal to transmit the packet including the known signal such that the variation information on the amplitude and the variation information on the phase (uplink channel information) are calculated on the access point side. The combination may be determined by use of both the variation information received from the terminal and the variation information calculated by the access point itself. The directivity of the antenna may be switched between the uplink communication and the downlink communication. The controller 101 set the combination of the directivities in the antennas 12A to 12D in the communication with the terminal.

The controller 101 may access a storage for storing the information to be transmitted via the frame to the terminal or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

As an example, the controller 101 may store in a storing device the identification information on the directivity for each of the antennas 12A to 12D in a form of a table or the like with respect to the target terminal to the antenna directivity control (see FIGS. 9(A) and 9(B), FIGS. 11(A) and 11(B)). The controller 101 may store in a storing device, in the case of performing the operation flow in FIG. 15, information concerning which of the target terminal to the antenna directivity control, the non-target terminal to the antenna directivity control, and the target terminal to the sounding-based antenna directivity control the terminal corresponds to, for each terminal in a form of a table or the like.

The above described isolation of the processes of the controller 101 and the transmitter 102 is an example, and another form may be used. For example, the controller 101 may perform the process until the digital region process and the DA conversion, and the transmitter 102 may perform the process subsequent to the DA conversion. As for the isolation of the processes of the controller 101 and the receiver 103, similarly, the receiver 103 may perform the process before the AD conversion and the controller 101 may perform the digital region process including processes following the AD conversion. Isolation other than those described above may be used.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 17:
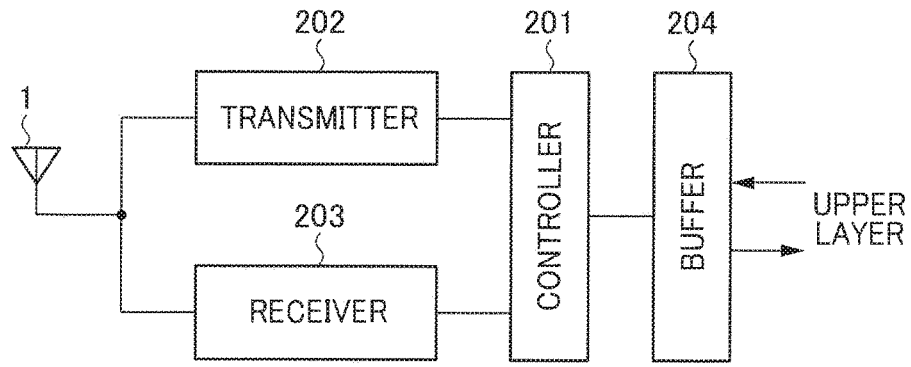
FIG. 17 is a functional block diagram of a wireless communication device installed in a wireless terminal.

FIG. 17 is a functional block diagram of the wireless communication device installed in the terminal.

The wireless communication device includes a controller 201, a transmitter 202, a receiver 203, at least one antenna 1, and a buffer 204. The controller 201 corresponds to controlling circuitry or a baseband integrated circuit which controls communication with the access point 11, and the transmitter 202 and the receiver 203 form a wireless communicator or an RF integrated circuit which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 103.

The buffer 204 is a storage for transferring a frame, data or the like between an upper layer and the controller 201. The buffer 204 may be a volatile memory such as a DRAM or a non-volatile memory such as a NAND, or an MRAM.

The upper layer generates the frames or data to be transmitted to other terminals, the access point 11, or a device on another network such as a server and stores the generated frames in the buffer 204, or takes in, via the buffer 204, the frame or the payload thereof received from other terminals, the access point, or a device on another network such as a server. The upper layer may perform an upper communication process than a MAC layer such as a TCP/IP or a UDP/IP. The TCP/IP or the UDP/IP may be performed in the controller 201 and the upper layer may perform a process of an application layer of processing the data upper than the TCP/IP or the UDP/IP. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point 11 to control the communication with the access point 11. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, receives the beacon frame to detect the attribute and synchronization information of BSS of the access point 11 and then transmits an association request to the access point 11 to perform an association process in response to the received beacon. Thereby, the control 201 exchanges required information on capability or an attribute etc. each other and establishes the wireless link with the access point 11. The controller 201 may perform a process such as an authentication process if necessary before transmitting the association request. The controller 201 may transmit the number of antennas included in the terminal of itself or information of whether the terminal is compliant with beam forming as the capability information of the terminal. The capability information may be transmitted, in addition to at the association process, when receiving the acquisition request for the capability information from the access point.

The controller 201 periodically checks the buffer 204 to detect a state of the buffer 204 such as whether or not the data exists to be transmitted by way of the uplink transmission. Alternatively, the controller 201 checks the state of the buffer 204 by a trigger from the external such as the buffer 204. Once the controller 201 confirms the existence of the data in the buffer 204, it may transmit, after acquiring the access right to the wireless medium (transmission right) in accordance with the CSMA/CA or the like, the frame containing the relevant data (more specifically, the physical packet having the physical header added thereto) via the transmitter 202 and the antenna 1.

The transmitter 202 subjects the frame input from the controller 201 to DA conversion, a filtering process to extract components of a desired band, frequency conversion (up-conversion) and the like to amplify signals obtained through these processes by a pre-amplifier and radiate the amplified signals as radio waves from one or more antennas into the space. In a case where the plural antennas are included, the frame may be transmitted by way of beam forming.

The signal received by the antenna 1 is processed in the receiver 203. The received signal is amplified in the receiver 203 by the LNA, subjected to frequency conversion (down-conversion) and a filtering process to extract components of the desired band. The extracted signals are further converted into digital signals through AD conversion and output to the controller 201. The controller 201 performs demodulation, error-correcting decode, and a process of the physical header, and thereby the frame are such as the data frame (including the frame received by way of the DL-MU-MIMO) are acquired. If a receiver address (Address 1) of the MAC header of the frame matches the MAC address of the terminal of itself, the relevant frame is processed as the frame directed to the terminal of itself. If not match, the relevant frame is discarded.

The controller 201 carries out the CRC check of the received frame (in a case of the aggregation frame, the CRC check is carried out for the plural data frames in the aggregation frame). The controller 201 transmits the acknowledgement response frame via the transmitter 202 after elapse of a certain time period such as the SIFS from the completion of receiving the frame. If the controller 201 receives the RTS frame from the access point 11, it transmits, as the acknowledgement response frame with respect to it, the CTS frame.

The controller 201, in the case of acquiring the packet for the sounding from the access point, measures the known signal included in the packet to acquire the variation information (or difference information) on the amplitude and phase. The controller 201 transmits a response frame including the acquired variation information to the access point 11. The controller 201 may transmits the packet including the known signal for the sounding if required by the access point.

If the controller 201 transmits the frame such as the data frame to the access point, it receives via the receiver 203 the acknowledgement response frame (such as the ACK frame or the BA frame) transmitted from the access point 11 after elapse of a certain time period such as the SIFS from the completion of the transmission. The controller 201 determines whether or not the data frame (the individual aggregated data frames in a case of the aggregation frame) is successfully transmitted on the basis of the acknowledgement response frame.

The controller 201 may access a storage device that stores either information to be notified to the access point 11 or the information notified from the access point 11 or both of these pieces of information and read the information. The storage device may be an internal memory device, an external memory device, a volatile memory device, or a non-volatile memory. Also, the storage devices such as an SSD and a hard disk may be used in place of the memory device.

The above described isolation of the processes of the controller 201 and the transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion. Isolation other than those described above may be used.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

The terminal (non-AP station) may include a plurality of antennas each having directivity controllable similarly to the access point and control the directivity for the antenna (see FIGS. 8, 10, 12 to 14).

Second Embodiment

Figure 18:
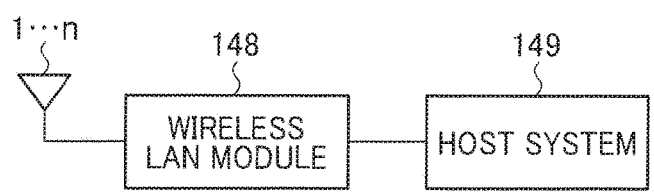
FIG. 18 is a diagram showing an exemplary entire configuration of a terminal or access point.

FIG. 18 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 19:
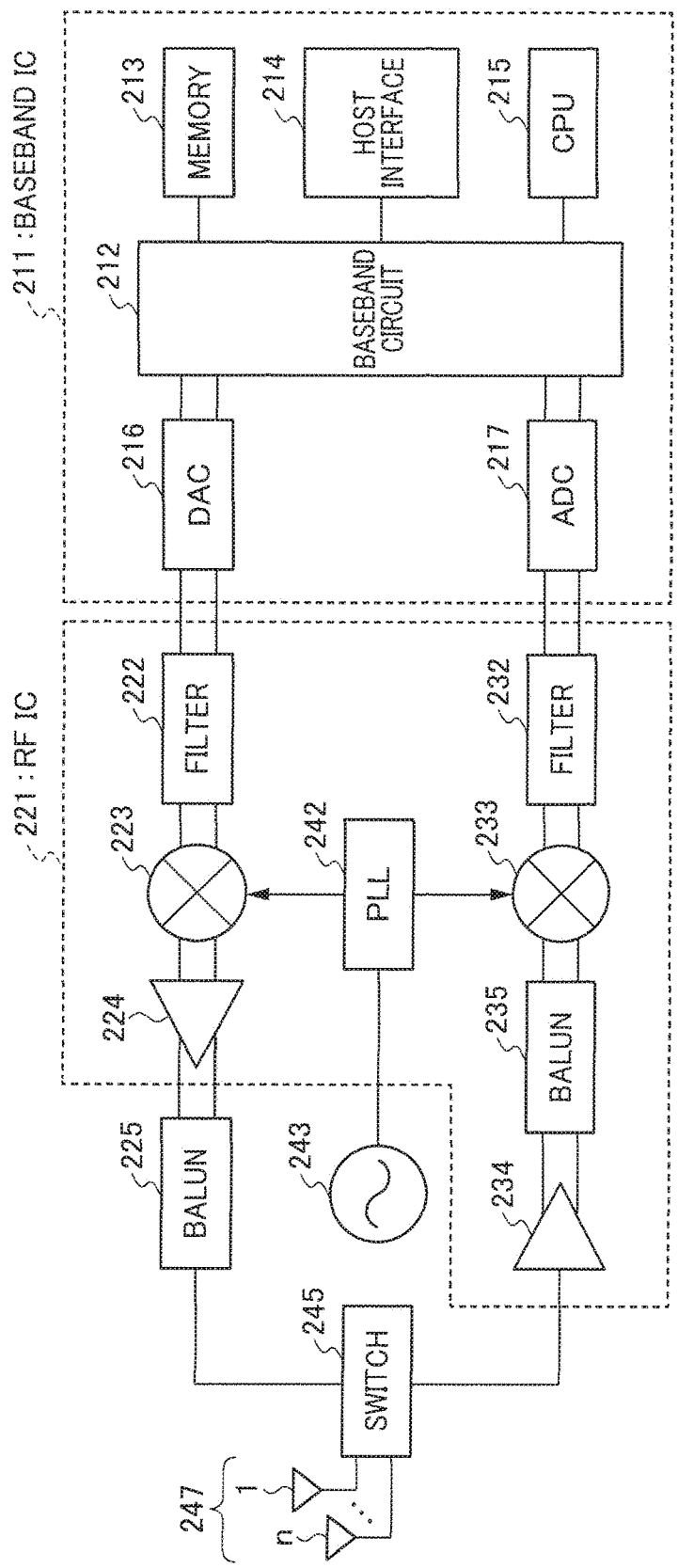
FIG. 19 is a diagram showing an exemplary hardware configuration of a wireless communication device installed at an access point or a terminal according to a second embodiment.

FIG. 19 shows an example of hardware configuration of a wireless LAN module. The configuration can also be applied when the wireless communication device (or a wireless device) is mounted on either one of the terminal that is a non-base station and the base station. The directivities of antennas of the access point are controllable. The directivity of an antenna(s) of the terminal may be not controllable. Due to this difference, operations of the baseband circuit and the switch may vary between the access point and the terminal. In the drawing, n antennas are shown by reference numeral 247 collectively. In the access point, the value of n is two or more, and in the terminal, the value of n is one or more. In case of a plurality of antennas, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

In a case that the module of FIG. 19 is an access point, the switch 245 controls the directivities of the antennas 1 to n according to an instruction signal of the baseband IC 211, the baseband circuit 212 or the CPU 215. For example, each antenna has a plurality of branches, and the switches controls an impedance or a resistance of each of branches in each antenna to control the directivity of each antenna.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Third Embodiment

Figure 20:
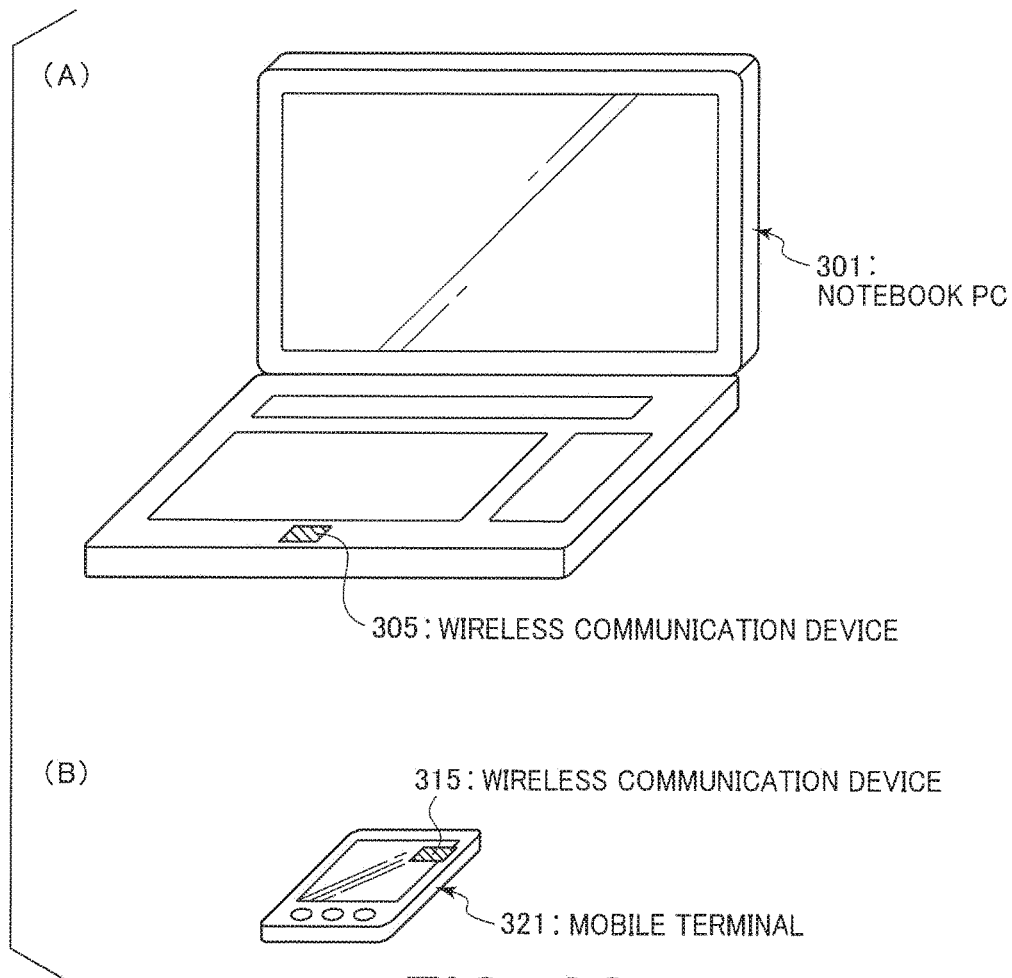
FIG. 20 shows perspective views of a terminal according to a third embodiment.

FIG. 20(A) and FIG. 20(B) are perspective views of wireless terminal according to the third embodiment. The wireless terminal in FIG. 20(A) is a notebook PC 301 and the wireless communication device (or a wireless device) in FIG. 20(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 21:
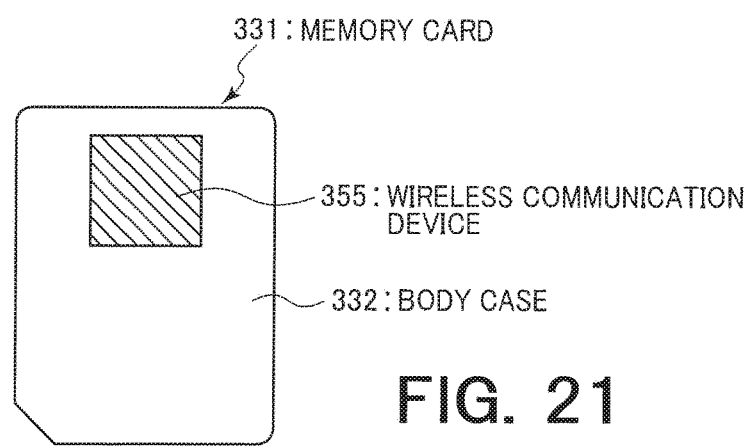
FIG. 21 is a diagram showing a memory card according to the third embodiment.

Moreover, a wireless communication device installed in a terminal (which may indicate a base station) can also be provided in a memory card. FIG. 21 illustrates an example of a wireless communication device mounted on a memory card. A memory card 331 contains a wireless communication device 355 and a body case 332. The memory card 331 uses the wireless communication device 355 for wireless communication with external devices. Here, in FIG. 21, the description of other installed elements (for example, a memory, and so on) in the memory card 331 is omitted.

Fourth Embodiment

In the fourth embodiment, a bus, a processor unit and an external interface unit are provided in addition to the configuration of the wireless communication device of the terminal (which may indicate the base station or both of them) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fifth Embodiment

In the fifth embodiment, a clock generating unit is provided in addition to the configuration of the wireless communication device of the terminal (which may indicate the base station or both of them) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Sixth Embodiment

In the sixth embodiment, a power source unit, a power source controlling unit and a wireless power feeding unit are included in addition to the configuration of the wireless communication device of the terminal (which may indicate the base station or both of them) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Seventh Embodiment

In the seventh embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eighth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Ninth Embodiment

In the ninth embodiment, an LED unit is added to the configuration of the wireless communication device of the terminal (which may indicate the base station or both of them) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Tenth Embodiment

In the tenth embodiment, a vibrator unit is included in addition to the configuration of the wireless communication device wireless communication device of the terminal (which may indicate the base station or both of them) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Eleventh Embodiment

In the eleventh embodiment, the configuration of the wireless communication device includes a display in addition to the configuration of the wireless communication device (the wireless communication device of the terminal (which may indicate the base station or both of them) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Twelfth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 22:
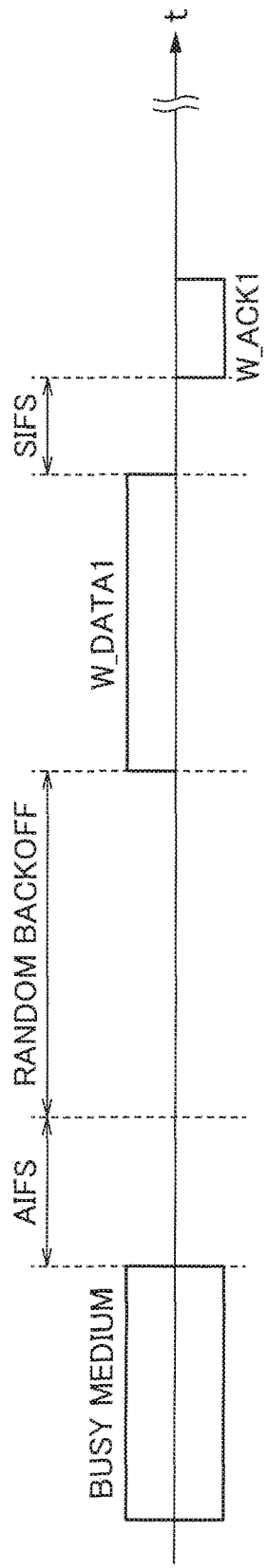
FIG. 22 is a diagram showing an example of frame exchange during a contention period.

Here, FIG. 22 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
controlling circuitry configured to
set directivities of a plurality of antennas so that a synthesis directivity of the directivities becomes an omnidirectional directivity,
receive a first frame via the plurality of antennas having the synthesis directivity of the omnidirectional directivity and
adjust the directivities of the plurality of antennas based on a received power of each antenna of the first frame; and
a transmitter configured to transmit a second frame for response to the first frame after the directivities of the plurality of antennas are adjusted,
wherein the controlling circuitry is configured to specify an antenna having a highest received power among the plurality of antennas and adjust directivities of antennas other than the specified antenna among the plurality of antennas to a directivity of the specified antenna, respectively.

2. The wireless communication device according to claim 1, wherein the controlling circuitry is configured to
calculate a difference between a received power of the specified antenna and each of received powers of the other antennas,
adjust the directivities of the other antennas to the directivity of the specified antenna, respectively, in a case where the difference is equal to or more than a threshold and
keep the directivities of the other antennas in a case where the difference is less than the threshold.

3. The wireless communication device according to claim 1, wherein the controlling circuitry is configured to
specify two or more antennas having received powers which are highest among the plurality of antennas and
adjust directivities of other antennas than the two or more antennas to the directivity of one of the two or more antennas.

4. The wireless communication device according to claim 1, wherein the controlling circuitry is configured to
specify two antennas having received powers which are highest among the plurality of antennas,
compare received powers of the two antennas to each other, and, in a case where a difference of the received powers is equal to or more than a threshold,
adjust the directivity of the antenna having a lower received power of the two antennas and the directivities of other antennas than the two antennas to the directivity of the antenna having a higher received power of the two antennas, respectively, and
in a case where the difference is less than the threshold, adjust the directivities of the other antennas to the directivity of any one of the two antennas.

5. The wireless communication device according to claim 1, wherein the controlling circuitry is configured to adjust the directivities of the plurality of antennas when the first frame is received after the transmitter has unsuccessfully transmitted a third frame.

6. The wireless communication device according to claim 1, further comprising the plurality of antennas.

7. A wireless communication device comprising:
controlling circuitry configured to
set directivities of a plurality of antennas so that a synthesis directivity of the directivities becomes an omnidirectional directivity,
receive a first frame via the plurality of antennas having the synthesis directivity of the omnidirectional directivity and
adjust the directivities of the plurality of antennas based on a received power of each antenna of the first frame; and
a transmitter configured to transmit a second frame for response to the first frame after the directivities of the plurality of antennas are adjusted,
wherein the controlling circuitry is configured to receive capability information of another wireless communication device that has transmitted the first frame, the capability information including information on a number of antennas of the other wireless communication device or information whether the other wireless communication device can carry out beam forming,
the controlling circuitry is configured to adjust the directivities of the plurality of antennas so that the synthesis directivity of the directivities becomes the omnidirectional directivity
when the number of the antennas of the other wireless communication device is two or more or the other wireless communication device can carry out the beam forming and
when a received power of a signal received from the other wireless communication device is a threshold value or more, and
the transmitter is configured to transmit the second frame after the directivities of the plurality of antennas are adjusted to the omnidirectional directivity.

8. The wireless communication device according to claim 7, wherein
the controlling circuitry is configured to determine whether to adjust the directivities of the plurality of antennas based on the capability information and channel communication quality of a channel used for communication with the other wireless communication device.

9. A wireless communication method comprising:
setting directivities of a plurality of antennas so that a synthesis directivity of the directivities becomes an omnidirectional directivity;
receiving a first frame via the plurality of antennas having the synthesis directivity of the omnidirectional directivity;
adjusting the directivities of the plurality of antennas based on a received power of each antenna of the first frame; and
transmitting a second frame for response to the first frame after the directivities of the plurality of antennas are adjusted,
wherein the adjusting includes specifying an antenna having highest received power among plurality of antennas and adjusting directivities of antennas other than the specified antenna the plurality of antenna a directivity of the specified antenna, respectively.

10. The wireless communication method according to claim 9, comprising:
calculating a difference between the received power of the specified antenna and each of received powers of the other antennas;
adjusting the directivities of the other antennas to the directivity of the specified antenna, respectively, in a case where the difference is equal to or more than a threshold; and
keeping the directivities of the other antennas in a case where the difference is less than the threshold.

11. The wireless communication method according to claim 9, comprising:
specifying two or more antennas having received powers which are highest among the plurality of antennas and adjusting directivities of other antennas than the two or more antennas to the directivity of one of the two or more antennas.

12. The wireless communication method according to claim 9, comprising:
specifying two antennas having received powers which are highest among the plurality of antennas;
comparing received powers of the two antennas to each other;
adjusting, in a case where a difference of the received powers is equal to or more than a threshold, the directivity of the antenna having a lower received power of the two antennas and the directivities of other antennas than the two antennas to the directivity of the antenna having a higher received power of the two antennas, respectively; and
adjusting, in a case where the difference is less than the threshold, the directivities of the other antennas to the directivity of any one of the two antennas.

13. The wireless communication method according to claim 9, comprising:
adjusting the directivities of the plurality of antennas when the first frame is received after a third frame has been unsuccessfully transmitted.

14. A wireless communication method comprising:
setting directivities of a plurality of antennas so that a synthesis directivity of the directivities becomes an omnidirectional directivity;
receiving a first frame via the plurality of antennas having the synthesis directivity of the omnidirectional directivity;
adjusting the directivities of the plurality of antennas based on a received power of each antenna of the first frame;
transmitting a second frame for response to the first frame after the directivities of the plurality of antennas are adjusted; and
receiving capability information of another wireless communication device that transmitted the first frame, the capability information including information on a number of antennas of the other wireless communication device or information on whether the other wireless communication device can carry out beam forming,
wherein the adjusting includes adjusting the directivities of the plurality of antennas so that the synthesis directivity of the directivities becomes the omnidirectional directivity
when the number of the antennas of the other wireless communication device is two or more or the other wireless communication device can carry out the beam forming and when a received power of a signal received from the other wireless communication device is a threshold value or more, and the transmitting includes transmitting the second frame after the directivities of the plurality of antenna are adjusted to the omnidirectional directivity.

15. The wireless communication method according to claim 14, comprising:

determining whether to adjust the directivities of the plurality of antennas based on the capability information and channel communication quality of a channel used for communication with the other wireless communication device.

* * * * *